US012681901B2

(12) United States Patent
Zhang et al.

(10) Patent No.: US 12,681,901 B2
(45) Date of Patent: Jul. 14, 2026

(54) DE-DUPLICATION

(71) Applicant: Dell Products L.P., Round Rock, TX (US)

(72) Inventors: Tianbo Zhang, Shanghai (CN); Heyang Sun, Shanghai (CN); Xiao Le Shang, Shanghai (CN); Lu Lei, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 19/007,011

(22) Filed: Dec. 31, 2024

(65) Prior Publication Data

US 2026/0147733 A1 May 28, 2026

(30) Foreign Application Priority Data

Nov. 22, 2024 (CN) .......................... 202411686225.7

(51) Int. Cl.
*G06F 16/174* (2019.01)

(52) U.S. Cl.
CPC ................................ *G06F 16/1748* (2019.01)

(58) Field of Classification Search
None
See application file for complete search history.

(56) References Cited

U.S. PATENT DOCUMENTS

| | | | | |
|---|---|---|---|---|
| 7,418,439 | B2 * | 8/2008 | Wong ................... | G06F 11/2071 |
| 7,886,291 | B1 * | 2/2011 | Jones ................... | H04L 63/1441 |
| | | | | 707/831 |
| 7,945,897 | B1 * | 5/2011 | Cook ..................... | G06F 9/445 |
| | | | | 717/121 |
| 8,655,848 | B1 * | 2/2014 | Leverett ............... | G06F 16/178 |
| | | | | 709/201 |
| 9,521,198 | B1 * | 12/2016 | Agarwala ............... | G06F 3/061 |
| 10,387,384 | B1 * | 8/2019 | Bent ..................... | G06F 16/185 |
| 2011/0191294 | A2 * | 8/2011 | Sudhakar ............ | G06F 16/1873 |
| | | | | 707/638 |
| 2013/0304705 | A1 * | 11/2013 | Wong ................... | G06F 16/178 |
| | | | | 707/655 |
| 2014/0052692 | A1 * | 2/2014 | Zhang ................ | G06F 11/1464 |
| | | | | 707/639 |
| 2014/0074782 | A1 * | 3/2014 | Green .................. | G06F 3/0679 |
| | | | | 707/E17.005 |
| 2019/0369896 | A1 * | 12/2019 | Jreij ....................... | G06F 16/27 |

FOREIGN PATENT DOCUMENTS

| | | | | | |
|---|---|---|---|---|---|
| CN | 112181587 A | * | 1/2021 | ......... | G06F 9/45558 |
| CN | 119441150 A | * | 2/2025 | ............. | G06F 16/13 |

* cited by examiner

*Primary Examiner* — Hasanul Mobin
(74) *Attorney, Agent, or Firm* — Amin, Turocy & Watson, LLP

(57) ABSTRACT

The present disclosure relates to de-duplication. An example method includes acquiring mirror files, wherein each mirror file in the mirror files includes at least one layer. The method further includes generating a directory by de-duplicating layers of the mirror files. The method further includes redirecting the de-duplicated mirror files to the directory by using hard links. The method further includes packaging the redirected mirror files and the directory into a target package. Beneficially, the mirror files can be de-duplicated in a unit of layer, and the flexibility in downloading a part of the mirror files can further be ensured.

20 Claims, 14 Drawing Sheets

DE-DUPLICATION

RELATED APPLICATION

The present application claims the benefit of priority to Chinese Patent Application No. 202411686225.7, filed on Nov. 22, 2024, which application is hereby incorporated into the present application by reference herein in its entirety.

TECHNICAL FIELD

The present disclosure generally relates to de-duplication for computers, and, for example, to a method, a device, and a computer program product for de-duplication.

BACKGROUND

The container technology is a lightweight operating system-level virtualization method that allows developers to package applications and their dependencies into mirror files and deploy containers by instantiating the mirror files in a container management platform (such as Kubernetes and k8s).

Mirror files can run on any platform that supports the same container technology, regardless of differences in the underlying operating system. As a result, it is easier to migrate and expand applications, and development teams can quickly respond to changes in business needs to achieve agile development and continuous delivery. Compared with conventional virtual machines, containers share an operating system kernel of a host, rather than providing a complete operating system instance for each application, and therefore, the containers are lighter, faster to boot, and consume fewer resources.

SUMMARY

Example, non-limiting embodiments of the present disclosure provide a method, a device, and a computer program product for de-duplication.

In a first example embodiment of the present disclosure, a method for de-duplication is provided. The method includes acquiring a plurality of mirror files, wherein each mirror file in the plurality of mirror files includes at least one layer. The method further includes generating a directory by de-duplicating a plurality of layers of the plurality of mirror files. The method further includes redirecting the plurality of de-duplicated mirror files to the directory by using hard links. The method further includes packaging the plurality of redirected mirror files and the directory into a target package.

In a second example embodiment of the present disclosure, an electronic device is provided. The electronic device includes one or a plurality of processors; and a storage device for storing one or a plurality of programs, wherein the one or plurality of programs, when executed by the one or plurality of processors, cause the one or plurality of processors to perform actions including acquiring a plurality of mirror files, wherein each mirror file in the plurality of mirror files includes at least one layer. The actions further include generating a directory by de-duplicating a plurality of layers of the plurality of mirror files. The actions further include redirecting the plurality of de-duplicated mirror files to the directory by using hard links. The actions further include packaging the plurality of redirected mirror files and the directory into a target package.

In a third example embodiment of the present disclosure, a computer program product is provided. The computer program product is tangibly stored on a non-volatile computer-readable medium and includes machine-executable instructions, wherein the machine-executable instructions, when executed, cause a machine to perform actions including acquiring a plurality of mirror files, wherein each mirror file in the plurality of mirror files includes at least one layer. The actions further include generating a directory by de-duplicating a plurality of layers of the plurality of mirror files. The actions further include redirecting the plurality of de-duplicated mirror files to the directory by using hard links. The actions further include packaging the plurality of redirected mirror files and the directory into a target package.

It should be understood that the content described in this Summary is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above-mentioned and other features, advantages, and aspects of the embodiments of the present disclosure will become more apparent with reference to the accompanying drawings and the following detailed description. In the accompanying drawings, identical or similar reference numerals represent identical or similar elements, in which.

DETAILED DESCRIPTION

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be construed as "at least one embodiment." The terms "first," "second," and the like may refer to different or the same objects. Other explicit and implicit definitions may also be included below.

In related technologies, different mirror files often have some identical layers. After a user downloads some mirror files that may need to be deployed, the user may allocate storage space for each mirror file separately, resulting in a lot of storage space wasted by these identical layers (that is, duplicate layers). Some technical solutions de-duplicate the identical layers in these mirror files and only retain one copy of layer data, but this needs to package these mirror files into one package and store the package in a node. When the user needs to call a part of the mirror files, the user needs to download the entire package from the node to the local, and then determine, from the package, the mirror files that need to be called, which is very inflexible, while leading to a waste of a lot of bandwidth and storage space, and having a long download time.

Therefore, the present disclosure proposes a method for de-duplication. According to the method in the present disclosure, a directory without duplicate layers is generated by de-duplicating a plurality of layers of a plurality of mirror files, so that the duplicate layers in the plurality of mirror files are removed. Each type of layer is uniquely retained in the directory, and the plurality of de-duplicated mirror files are redirected to the directory through hard links, so that each mirror file can still be indexed to the originally included layers. Therefore, the plurality of mirror files can be de-duplicated in a unit of layer, and flexibility in downloading a part of the plurality of mirror files can be ensured.

Figure 1:
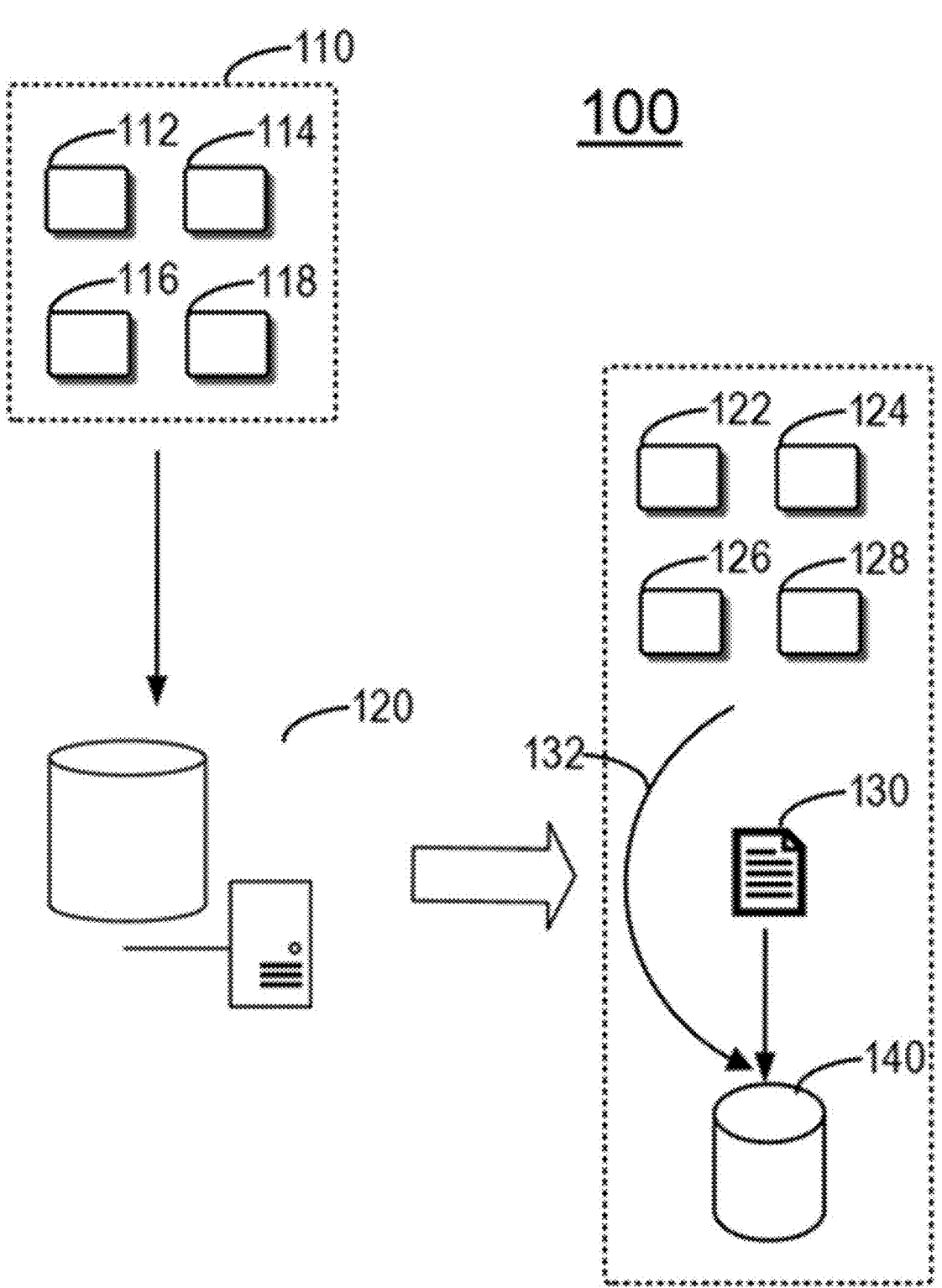
FIG. 1 is a schematic diagram of an example environment in which embodiments according to the present disclosure can be implemented.

FIG. 1 is a schematic diagram of an example environment 100 in which embodiments according to the present disclosure can be implemented. As shown in FIG. 1, the environment 100 may include a node 110 and a service unit 120. Mirror files 112, 114, 116, and 118 are stored in the node 110. These mirror files may, for example, be packaged as a package at the node 110 for storage.

Communication between the node 110 and the service unit 120 may be achieved via a network (not shown). The network may be, for example, a wide area network (WAN), a local area network (LAN), a wireless network, a public telephone network, an intranet, and any other type of network well known to those skilled in the art. The communication may also be achieved through physical lines (such as optical fibers and cables). The service unit 120 may form a part of a distributed system. It is understandable that the distributed system is a system consisting of a plurality of nodes, and these nodes may be computers, servers, or other processing nodes that are connected to each other over a network and work collaboratively. In the distributed system, a user usually faces a unified service portal, behind which a plurality of nodes work together to provide this service. These nodes may be located at different physical locations, and they communicate and coordinate through message passing. The distributed system may process and store data and share the data among different nodes to achieve higher availability, reliability, and performance. In addition, the distributed system may be used for performing various tasks (including a target task) including, but not limited to, data processing, storage management, scientific computing, and the like. The network may be, for example, a wide area network (WAN), a local area network (LAN), a wireless network, a public telephone network, an intranet, and any other type of network well known to those skilled in the art.

In this embodiment, the service unit 120 downloads a package including the mirror files 112, 114, 116, and 118 from the node 110 and performs unpacking processing to obtain the mirror files 112, 114, 116, and 118. Each mirror file in the mirror files 112 to 118 includes at least one layer. Typically, each mirror file is formed by superposing and combining a plurality of layers. Each layer contains a part of content of the mirror file, such as files and functional code.

The service unit 120 generates a directory 130 by de-duplicating a plurality of layers of the plurality of mirror files 112 to 118. Assuming that each mirror file in the mirror files 112 to 118 includes two layers, three of which are identical layers, then the service unit 120 de-duplicates the 2×4=8 layers to obtain 8−2=6 layers. The 6 layers that are different from each other are recorded in the directory 130, and the directory 130 is associated with a data block 140 that ultimately stores layer data of the 6 layers. By the de-duplication operation, the storage space of the mirror files 112 to 118 can be reduced, and the upload and/or download time can be shortened.

The service unit 120 redirects a plurality of de-duplicated mirror files 122, 124, 126, and 128 to the directory by using hard links. After the de-duplication, the mirror files 112 to 118 are processed into the mirror files 122 to 128, with a difference that the mirror files 112 to 118 each have their own layer data, while the mirror files 122 to 128 no longer have layer data, and various pieces of layer data are added to the directory 130. The mirror files 122 to 128 can be directly redirected, by using the hard links, to the data block 140 storing the various pieces of layer data, as shown by a curved arrow 132. By using the hard links, the mirror files 122 to 128 may be directly associated (i.e., redirected) to a database 140 storing the layer data without relying on the directory 130.

The service unit 120 packages the plurality of redirected mirror files and the directory into a target package. The target package has no duplicate layers, so it has a small size and high upload and download speeds, and occupies less bandwidth. Also, the various mirror files can be directly associated to the underlying layer data through the hard links, and therefore, during downloading of a part of the mirror files in the target package, it is unnecessary to download the entire target package, but only necessary to download the part of the mirror files by using the hard links, which has high flexibility.

The service unit 120 may be a cloud server used for providing basic cloud computing services such as cloud services, cloud databases, cloud computing, cloud functions, cloud storage, network services, cloud communications, middleware services, domain name services, security services, Content Delivery Networks (CDNs), and big data and artificial intelligence platforms. It should be noted that the method of the present disclosure may also be applied to scenarios of non-distributed systems, such as scenarios of centralized systems. In this embodiment, although the service unit 120 is shown as a separate device, the service unit 120 may be embedded into a server cluster.

Figure 2:
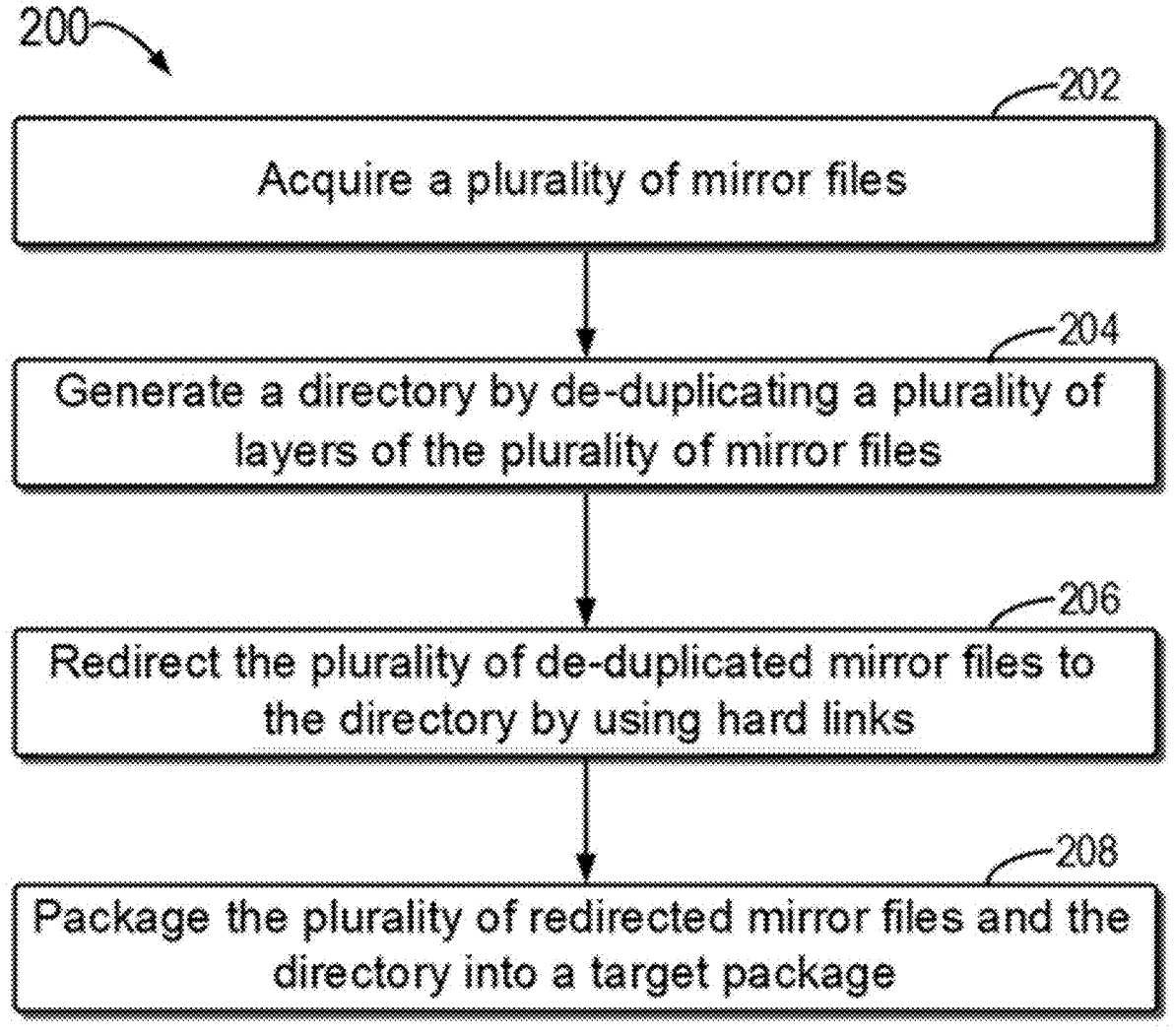
FIG. 2 is a flow chart of a method for de-duplication according to some embodiments of the present disclosure.

FIG. 2 is a flow chart of a method for de-duplication according to some embodiments of the present disclosure. As shown in FIG. 2, the flow chart 200 includes block 202 to block 208. At the block 202, the service unit 120 may acquire a plurality of mirror files 112 to 118, wherein each mirror file in the plurality of mirror files 112 to 118 includes at least one layer. The plurality of mirror files 112 to 118 may, for example, be acquired from a cloud platform. In this embodiment, there is no limit to the number of mirror files. In some embodiments, most of the mirror files include identical basic layers, and the basic layer may be, for example, an operating system layer, a runtime environment layer, a basic software dependency layer, or the like. On these identical basic layers, different mirror files can have different functional layers attached to them.

At the block 204, the service unit 120 may generate a directory 130 by de-duplicating a plurality of layers of the plurality of mirror files 112 to 118. In this embodiment, the various layers in the mirror files 112 to 118 are transferred to the directory 130, and the identical layers between the different mirror files are merged into a single layer and added to the directory 130. Layer data is also transferred to the directory 130. After the de-duplication processing, the various de-duplicated mirror files may no longer have layer data, but may retain layer names or layer identifiers of their own original layers.

At the block 206, the service unit 120 may redirect a plurality of de-duplicated mirror files 122 to 128 to the directory 130 by using hard links. The hard links refer to a plurality of file names pointing to the same index node (that is, data block) in the file system. For example, a file may have a plurality of names, and these names all point to the content of the same data block. When a hard link is created, it may be regarded as creating a new pointer (a mapping between a file name and a data block number) that shares the same data block number with the original file. The data blocks record the layer data. Through the operation, a file is established for each mirror file as an interface to access the corresponding layer data. Although the mirror file no longer has layer data, the mirror file may be directly associated with the layer data through the hard link operation.

At a block 208, the service unit 120 may package the plurality of redirected mirror files and the directory into a target package. In the packaging process, the hard links are also packaged, and therefore, the obtained target package not only includes non-duplicate layer data but also includes the redirection relationships between the mirror files and the layer data.

According to the method in the present disclosure, a directory without duplicate layers is generated by de-duplicating a plurality of layers of a plurality of mirror files, so that the duplicate layers in the plurality of mirror files are removed. Each type of layer is uniquely retained in the directory, and the plurality of de-duplicated mirror files are redirected to the directory through hard links, so that each mirror file can still be indexed to the originally included layers. Therefore, the plurality of mirror files can be de-duplicated in a unit of layer, and flexibility in downloading a part of the plurality of mirror files can be ensured.

Figure 3:
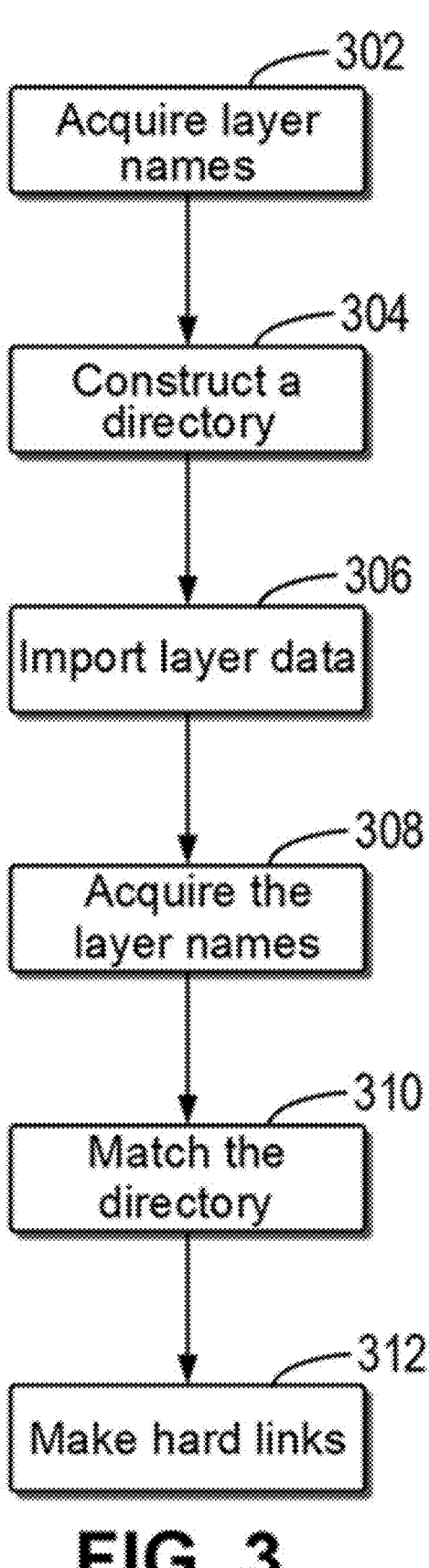
FIG. 3 is a flow chart of generating a directory according to an embodiment of the present disclosure.
Figure 5A:
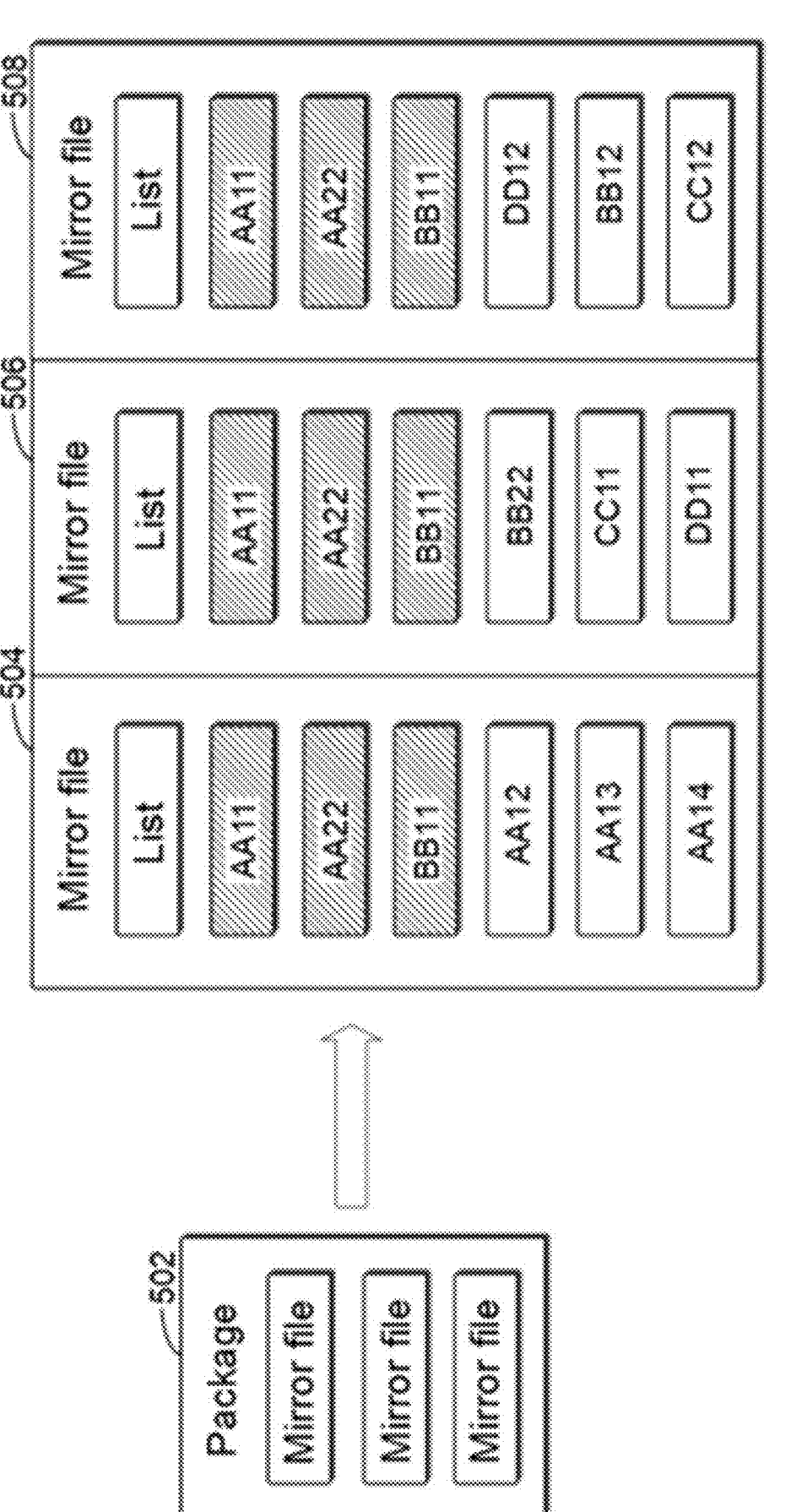
FIG. 5A is a schematic diagram of a package according to an embodiment of the present disclosure.

FIG. 3 is a flow chart of generating a directory according to an embodiment of the present disclosure. Typically, a layer in a mirror file includes a layer name and layer data. For the layer name, the layer data may be encoded, for example, by using a hash function to obtain a unique layer name that identifies the layer. Therefore, different pieces of layer data correspond to different layer names. At 302, a downloaded package may be unpacked to obtain a plurality of mirror files included in the package. FIG. 5A is a schematic diagram of a package according to an embodiment of the present disclosure. A user may, for example, download a package 502 from a cloud platform, and the package 502 includes three mirror files 504, 506, and 508. The mirror file 504 includes layers AA11, AA22, BB11, AA12, AA15, and AA14, and a list listing layer names of these layers. The mirror file 506 includes layers AA11, AA22, BB11, BB22, CC11, and DD11, and a list listing layer names of these layers. The mirror file 508 includes layers AA11, AA22, BB11, DD12, BB12, and CC12, and a list listing layer names of these layers. Existing duplicate layers are identified by shading. As can be seen from FIG. 5A, the layers AA11, AA22, and BB11 are included in the mirror files 504, 506, and 508, and are duplicate layers. In the later process, these layers will be de-duplicated.

Referring back to FIG. 3, at 304, a directory for the layers included in the mirror files 504, 506, and 508 is constructed by de-duplicating the mirror files 504, 506, and 508. The directory entries in the directory are different from each other, thus realizing the de-duplication of identifiers. In order to achieve the purpose of layer data de-duplication, layer data may be uniquely stored in the directory. Therefore, at 306, the layer data is imported into the directory.

In the embodiment, at least one sub-directory is established according to a plurality of layer names of the plurality of mirror files, wherein identical layer names correspond to the same directory entry in the sub-directory. The embodiment further includes adding layer data corresponding to each layer name to the at least one sub-directory to obtain the directory. In the operation, if layer data of a layer has already been added to the directory, the layer data does not need to be added to the directory and may be removed directly. The embodiment further includes removing a plurality of layers of a plurality of mirror files. After the layer data is added to various sub-directories of the directory, the layer data of the plurality of mirror files constitutes redundancy and may be removed. In the embodiment, different layers have different layer names, and therefore, generating the directory based on the layer names can uniquely identify the layers included in each mirror file. In the process of generating the directory, the layer data is transferred to the directory, and the layer data in the directory is unique, so the duplicate layers included in various mirror files are removed, and the space occupied by these mirror files is reduced.

Typically, each mirror file includes a list, which lists the layer names of the layers originally included in the mirror file. When generating the directory, reference may be made to the layer names recorded in the list. A mirror file typically includes a plurality of layers, and therefore, the generated directory often includes a plurality of sub-directories, and each of the sub-directories includes one or a plurality of directory entries. Each directory entry corresponds to one layer of one or a plurality of mirror files.

For establishing a sub-directory, in the embodiment, for each layer name of at least one layer of each mirror file, a preset number of characters in the layer name are acquired as a first name of the layer name. The preset number may be, for example, 2. The embodiment further includes detecting whether there is a sub-directory identical to the first name. The embodiment further includes adding, in response to the presence of a sub-directory identical to the first name, the layer name to the sub-directory as a directory entry of the sub-directory. That is, the layers with the preset number of characters being identical may be merged into the same sub-directory. According to the method for establishing a sub-directory in the embodiment, the sub-directories are distinguished by the preset number, so that when a specific directory entry in the directory is searched for or matched subsequently, the searching or matching efficiency may be improved without traversing all layers in the directory.

In the embodiment, in response to the absence of a sub-directory identical to the first name, a first sub-directory is established according to the first name. That is, a new sub-directory is set. The embodiment further includes adding the layer name to the first sub-directory as a directory entry of the first sub-directory. For example, the first two characters in the layer name may be regarded as an identifier for a directory entry in the sub-directory. By the new setting operation and the merging operation, it is easy and fast to generate the directory which covers all mirror files.

Figure 5B:
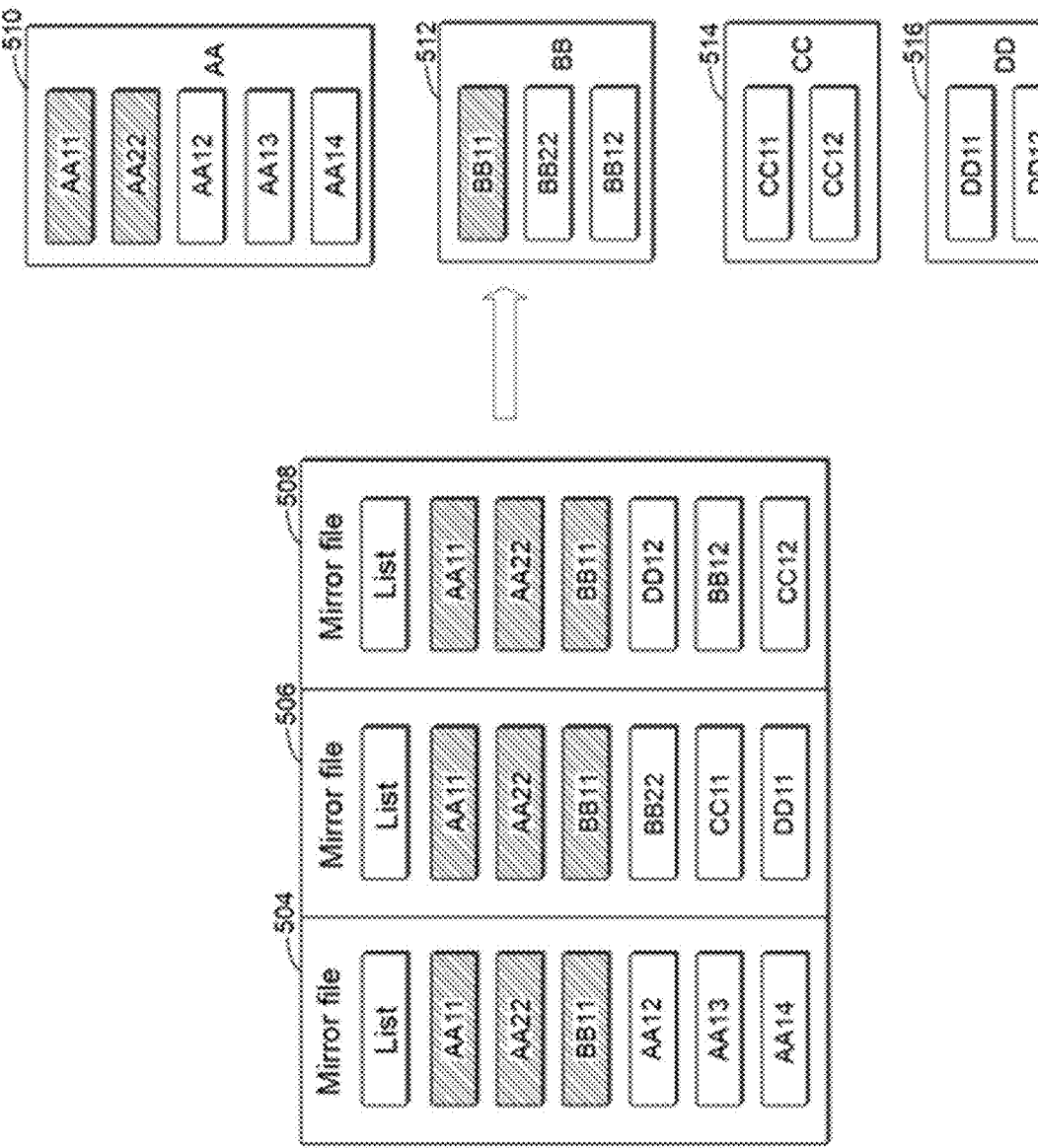
FIG. 5B is a schematic diagram of generating a directory according to an embodiment of the present disclosure.

FIG. 5B is a schematic diagram of generating a directory according to an embodiment of the present disclosure. In the embodiment, a sub-directory is generated based on each layer of mirror files 504 to 508 according to first two characters of a layer name by referring to a list included in the mirror file.

In the process of de-duplicating the mirror file 504, a sub-directory AA 510 is newly created according to a layer AA11, an identifier of the layer AA11 is marked as a directory entry of the sub-directory AA 510, and layer data of the layer AA11 is added to the sub-directory AA 510, corresponding to the directory entry AA11. Similarly, layers AA22, AA12, and AA14 are added to the sub-directory AA 510, and a layer BB11 is used to newly create a sub-directory BB 512 and added to the sub-directory BB 512. Here, the layer data in the mirror file 504 may be removed, and only the list is retained.

In a process of de-duplicating the mirror file 506, layers AA11, AA22, and BB11 are all duplicate layers that have been added to the sub-directories, and therefore, these layers do not need to be added but can be removed directly, thereby reducing the storage space occupied. Layers BB22, CC11, and DD11 are added to the sub-directory BB 512, a sub-directory CC 514, and a sub-directory DD 516 of the directory, respectively. Similarly, in a process of de-duplicating the mirror file 508, layers AA11, AA22, and BB11 are all duplicate layers that have been added to the sub-directories, and thus can be removed directly, thereby reducing the storage space occupied. Layers DD12, BB12, and CC12 are added to the sub-directory DD 516, the sub-directory BB 512, and the sub-directory CC 514 of the directory, respectively.

Figure 5C:
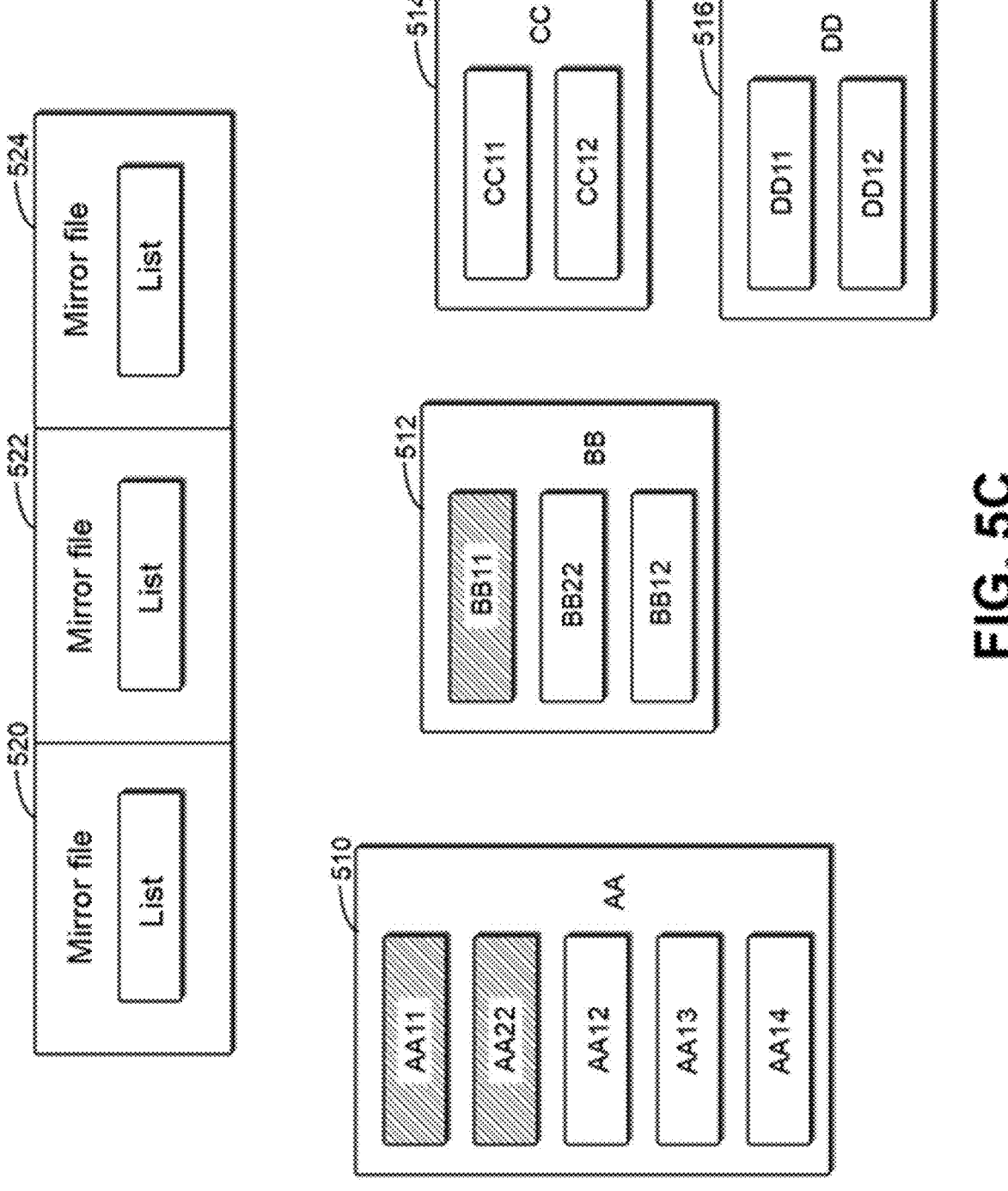
FIG. 5C is a schematic diagram of generating a directory according to an embodiment of the present disclosure.

Finally, 4 sub-directories are formed, namely, the sub-directory AA 510, the sub-directory BB 512, the sub-directory CC 514, and the sub-directory DD 516. These sub-directories constitute the directory corresponding to the package 502. After the de-duplication processing, the layers are classified into different sub-directories, the duplicate layers are not added to the directory, and the mirror files no longer retain the original layer data, which implements the effective de-duplication of the mirror files. FIG. 5C is a schematic diagram of generating a directory according to an embodiment of the present disclosure. As shown in the figure, mirror files 520, 522, and 524 are in a state ready to be redirected to a directory, and no longer include specific layer data. At the same time, a directory including 4 sub-directories is obtained, and each sub-directory has a plurality of directory entries and corresponding layer data.

Referring back to FIG. 3, after the directory with the layer data is generated, a process of establishing Hard Links may start. At 308, the layer names are acquired again. For example, the layer names may be acquired with reference to lists of various mirror files. At 310, for each layer name, the acquired layer name is matched with a directory entry in the directory, and the matching directory entry is acquired from the directory. For example, if a directory entry has the same name as the layer name, the directory entry may be determined as a matching directory entry. At 312, a target file is established in the mirror file by using the hard link, the target file pointing to layer data corresponding to the matching directory entry. According to each layer name in the list of the mirror file, a file pointing to the corresponding layer data is established in the mirror file by using the hard link, so that the mirror file is redirected to the originally included layer data. As a result, it is unnecessary to save the layer data in the mirror file, and a plurality of mirror files can share the same layer data, thereby reducing the volume of the plurality of mirror files.

Figure 4:
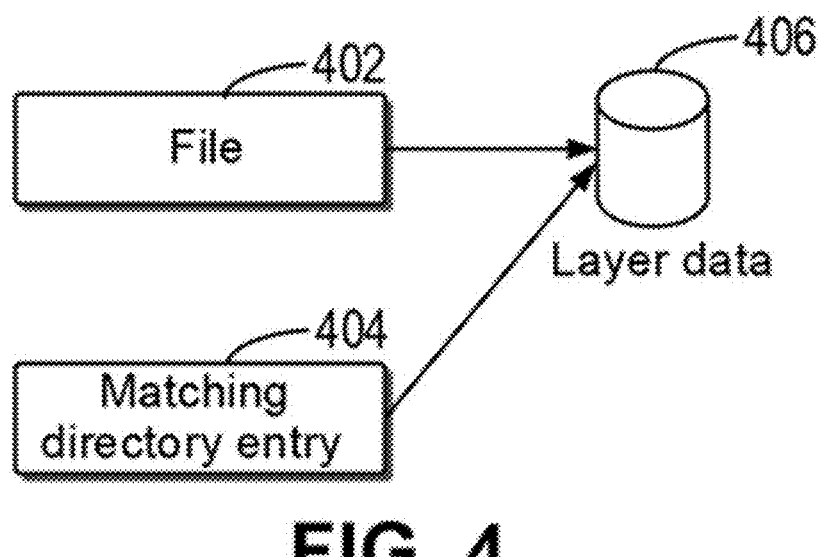
FIG. 4 is a schematic diagram of a hard link according to an embodiment of the present disclosure.

FIG. 4 is a schematic diagram of a hard link according to an embodiment of the present disclosure. An established file 402 does not point to a matching directory entry 404, but still directly points to layer data 406 together with the matching directory entry 404. Therefore, when layer data is acquired via a file in a mirror file, the corresponding layer data can be acquired directly without acquiring a directory entry in the directory. This can increase the flexibility of deploying mirror files.

Figure 5D:
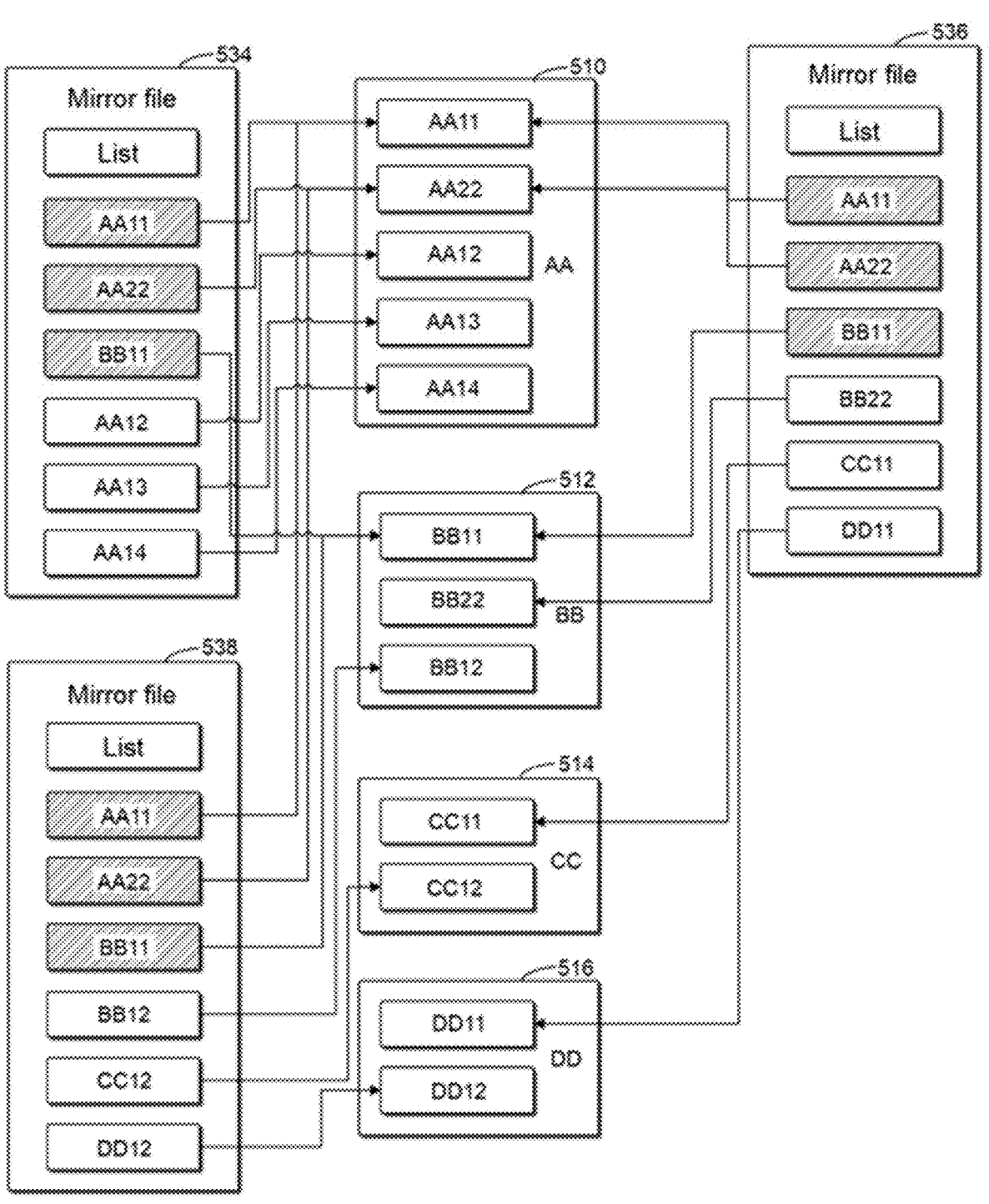
FIG. 5D is a schematic diagram of establishing hard links according to an embodiment of the present disclosure.

FIG. 5D is a schematic diagram of establishing hard links according to an embodiment of the present disclosure. As shown in the figure, files AA11, AA22, AA12, AA13, and AA14 in a mirror file 534 point to layer data corresponding to directory entries AA11, AA22, AA12, AA13, and AA14 in the sub-directory AA 510, respectively, and the file BB11 points to layer data corresponding to the directory entry BB11 in the sub-directory BB 512. Files AA11 and AA22 in a mirror file 536 point to layer data corresponding to directory entries AA11 and AA22 in the sub-directory AA 510, respectively, and files BB11 and BB22 point to layer data corresponding to directory entries BB11 and BB22 in the sub-directory BB 512, respectively. A file CC11 points to a directory entry CC11 in the sub-directory CC 514. A file DD11 points to layer data corresponding to a directory entry DD11 in the sub-directory DD 516. Files AA11 and AA22 in a mirror file 538 point to layer data corresponding to directory entries AA11 and AA22 in the sub-directory AA 510, respectively, and files BB11 and BB12 point to layer data corresponding to directory entries BB11 and BB12 in the sub-directory BB 512, respectively. A file CC12 points to a directory entry CC12 in the sub-directory CC 514. A file DD12 points to layer data corresponding to a directory entry DD12 in the sub-directory DD 516.

Figure 6A:
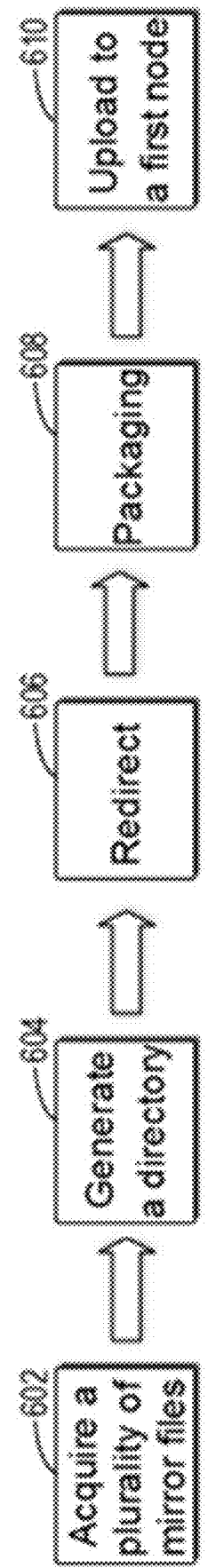
FIG. 6A is a schematic diagram for de-duplication according to an embodiment of the present disclosure.

The process of downloading a plurality of mirror files and processing them into a target package may be implemented in a variety of manners to adapt to different scenarios. FIG. 6A is a schematic diagram for de-duplication according to an embodiment of the present disclosure. At 602, a package in a directory format is acquired, the package including a plurality of mirror files, and each mirror file including at least one layer. The package has a package directory, and the package directory records the name of each mirror file. At 604, the plurality of mirror files are de-duplicated locally, and a directory is generated. At 606, the mirror files are redirected to the directory locally by utilizing hard links. At 608, the redirected mirror files and the directory are packaged to obtain a target package. At 610, the target package is uploaded to a first node for download by other nodes. In this case, the target package can be uploaded to the first node without acquiring user permissions, thereby providing the efficiency of deploying the mirror files.

Figure 6B:
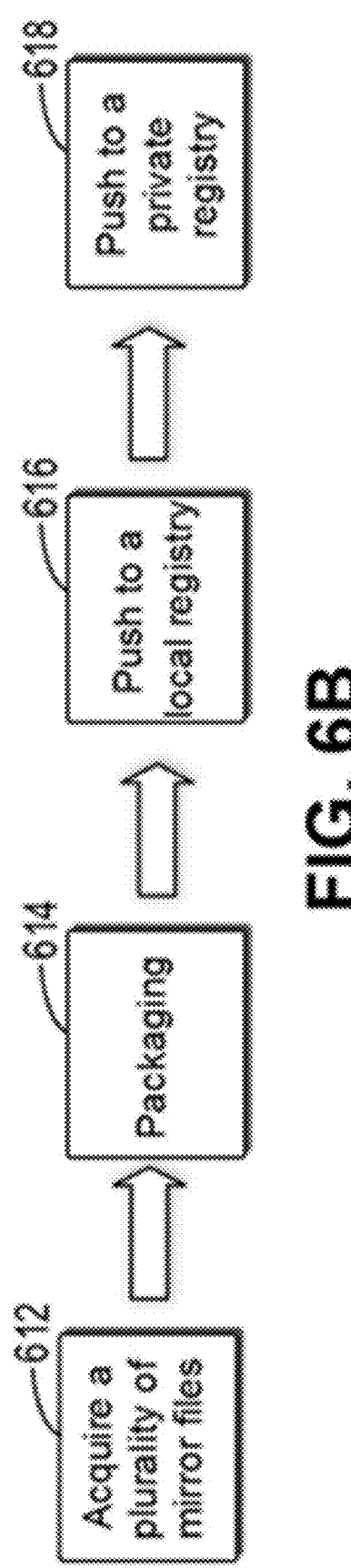
FIG. 6B is a schematic diagram for de-duplication according to an embodiment of the present disclosure.

FIG. 6B is a schematic diagram for de-duplication according to an embodiment of the present disclosure. At 612, a package in a target compression format is acquired, and the target compression format may be a tarball format. The tarball format is a common archive file format that is typically used to package a plurality of files and a directory into a single file for transmission, back-up, or distribution. At 614, redirected mirror files and a directory may be packaged according to the foregoing method to obtain a target package. At 616, the target package is pushed to a local registry for storage. At 618, the target package is pushed from the local registry to a private registry for storage, and the private registry may be a registry provided by a user for other nodes to download the target package.

The target package obtained by packaging the plurality of redirected mirror files and the directory may be used by a container management platform to deploy containers. In order to allow a plurality of nodes to download the target package, in an embodiment, the target package may be uploaded to a first node, and the first node may be, for example, a cloud server. The embodiment further includes downloading, if a node needs to deploy a plurality of mirror files of the target package, the target package from the first node by the node. If the node only intends to deploy a target mirror file in the target package, only the target mirror file in the target package may be downloaded from the first node. Because of the presence of hard links in the target package, the target package supports this flexible downloading method.

Figure 7:
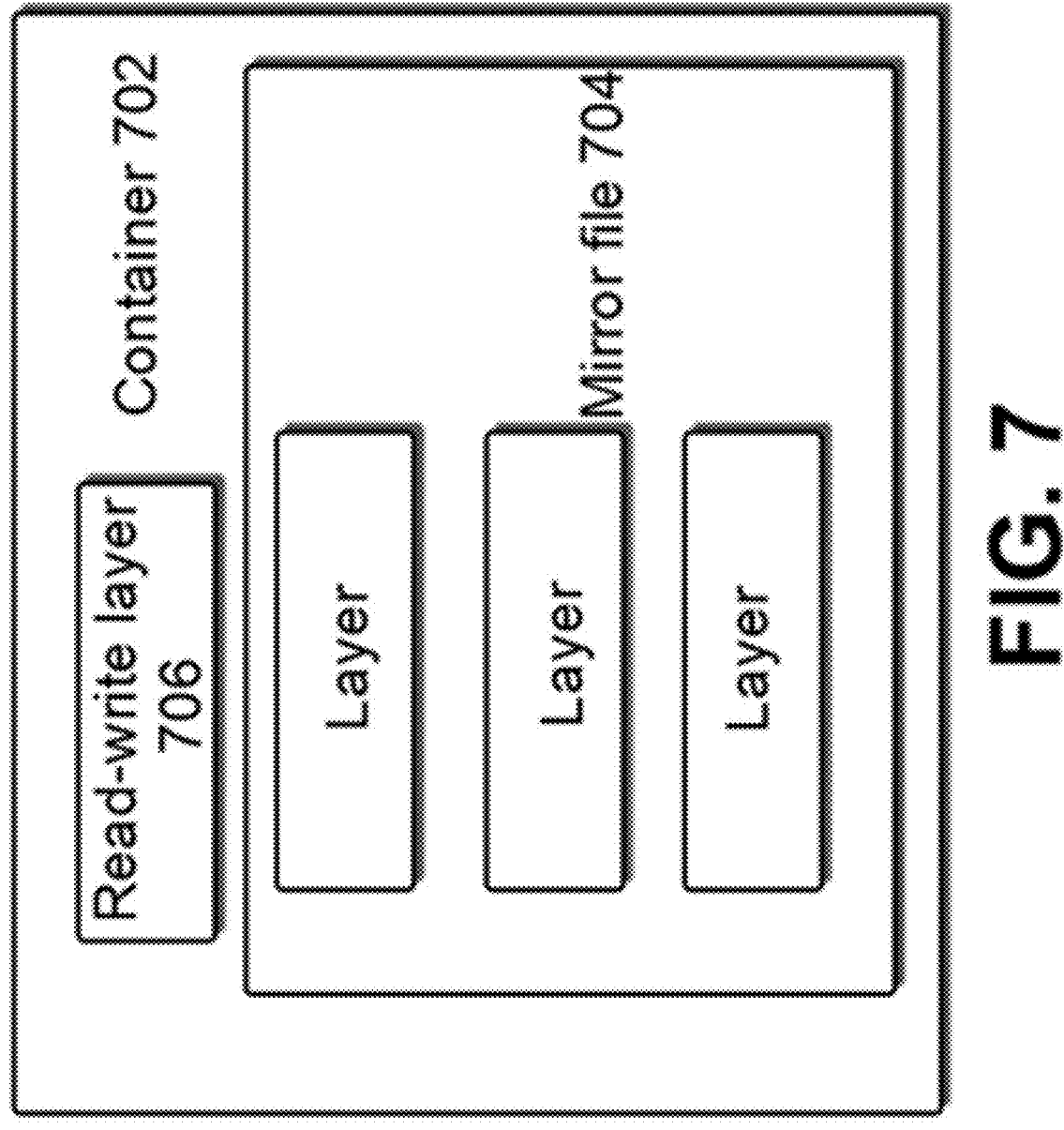
FIG. 7 is a schematic diagram of a deployment according to the present disclosure.

In a process of deploying a mirror file, the mirror file usually does not include a read-write layer. In order to enable a container that is obtained by deploying the mirror file to interact with a user, a read-write layer may be added on the basis of the mirror file to realize the read-write function. FIG. 7 is a schematic diagram of a deployment according to the present disclosure. A mirror file 704 originally includes 3 layers, and the 3 layers are read-only layers and have no edge for modification. A read-write layer 706 may be superimposed thereon to obtain 4 layers, and then layer data of the 4 layers may be run to obtain a container 702. A user may interact with the container 702.

Figure 8:
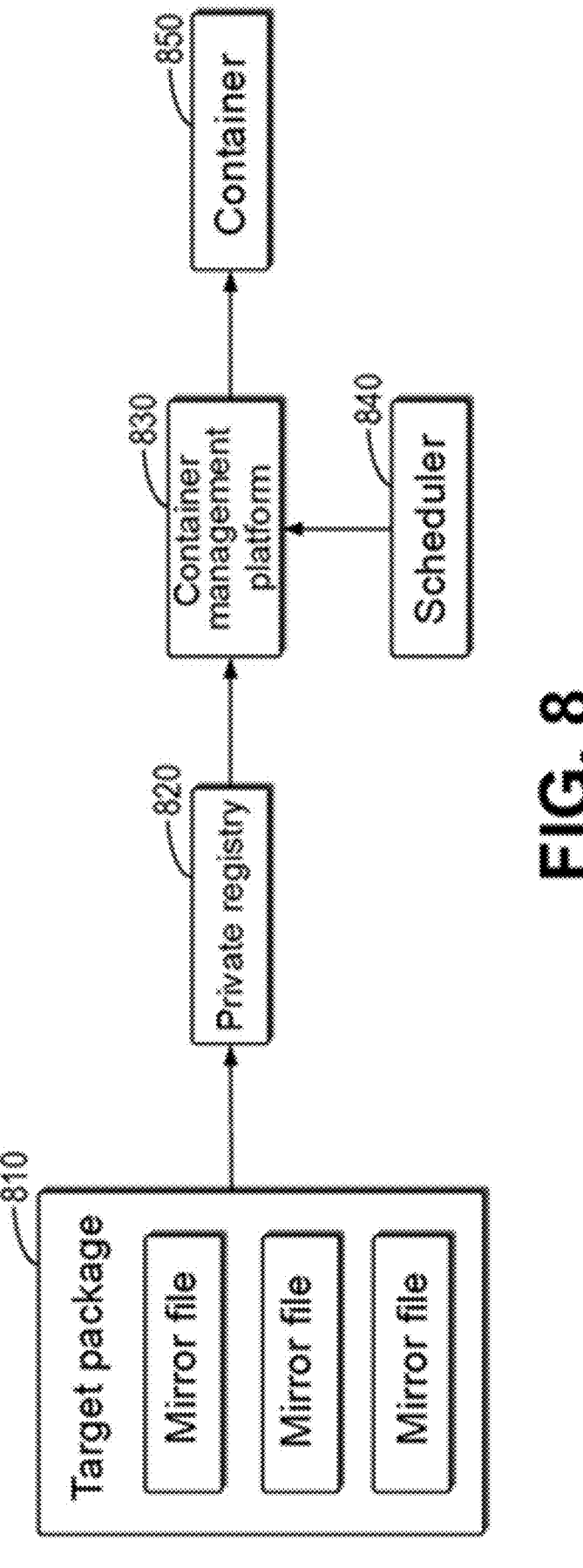
FIG. 8 is a schematic diagram of deploying a target package according to the present disclosure.

FIG. 8 is a schematic diagram of deploying a target package according to the present disclosure. In this embodiment, a target package 810 includes three mirror files. The target package 810 is obtained by processing according to the de-duplication method of the foregoing embodiment. The target package 810 may be stored in a private registry 820 of a user. A scheduler 840 may determine a deployment plan for deploying mirror files and send the deployment plan to a container management platform 830. After receiving the deployment plan, the container management platform 830 downloads the target package 810 from the private registry 820, and unpacks the target package 810 to obtain three mirror files. The container management platform 830 may then run layer data of the three mirror files to generate a corresponding container 850, thereby realizing deployment of the container. The target package has a small volume, and therefore, downloading the target package takes less time, which can improve the efficiency of deploying a container.

Figure 9A:
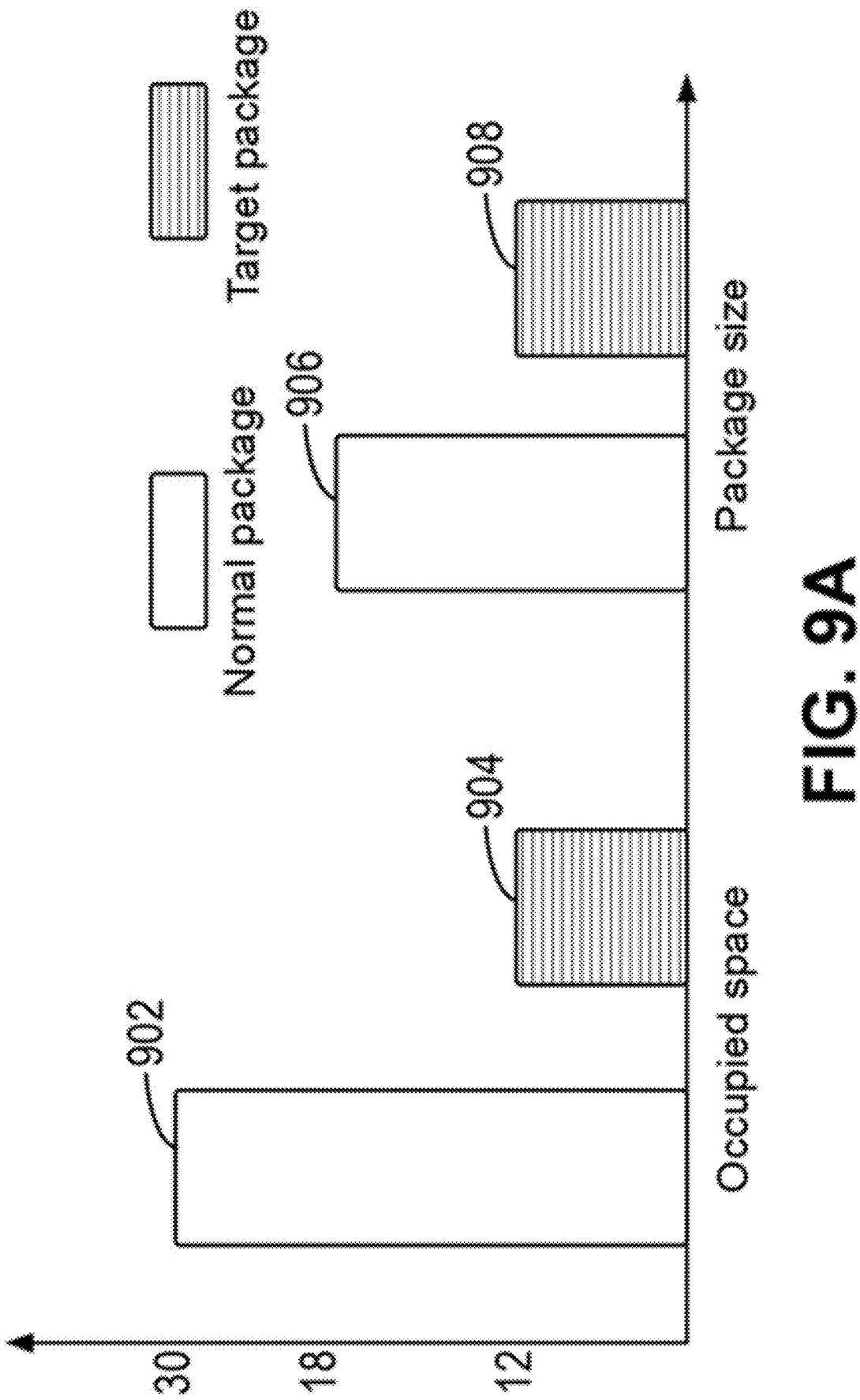
FIG. 9A is a schematic diagram of the space saving effect according to an embodiment of the present disclosure.

FIG. 9A is a schematic diagram of the space saving effect according to an embodiment of the present disclosure. A rectangle 902 represents the space occupied by a normal packaging process, which, for example, may be 30 G. A rectangle 904 represents the space occupied by packaging using the method according to the embodiment of the present disclosure, which is only about 12 G. Therefore, in the packaging process, the method according to the embodiment of the present disclosure can save the occupied space.

In addition, a rectangle 906 represents the size of a package generated by a conventional packaging process, which, for example, may be about 18 G. A rectangle 908 represents the size of a target package generated by packaging using the method according to the embodiment of the present disclosure, which is only about 12 G. As can be seen, the method according to the embodiment of the present disclosure can generate a package with a small volume.

Figure 9B:
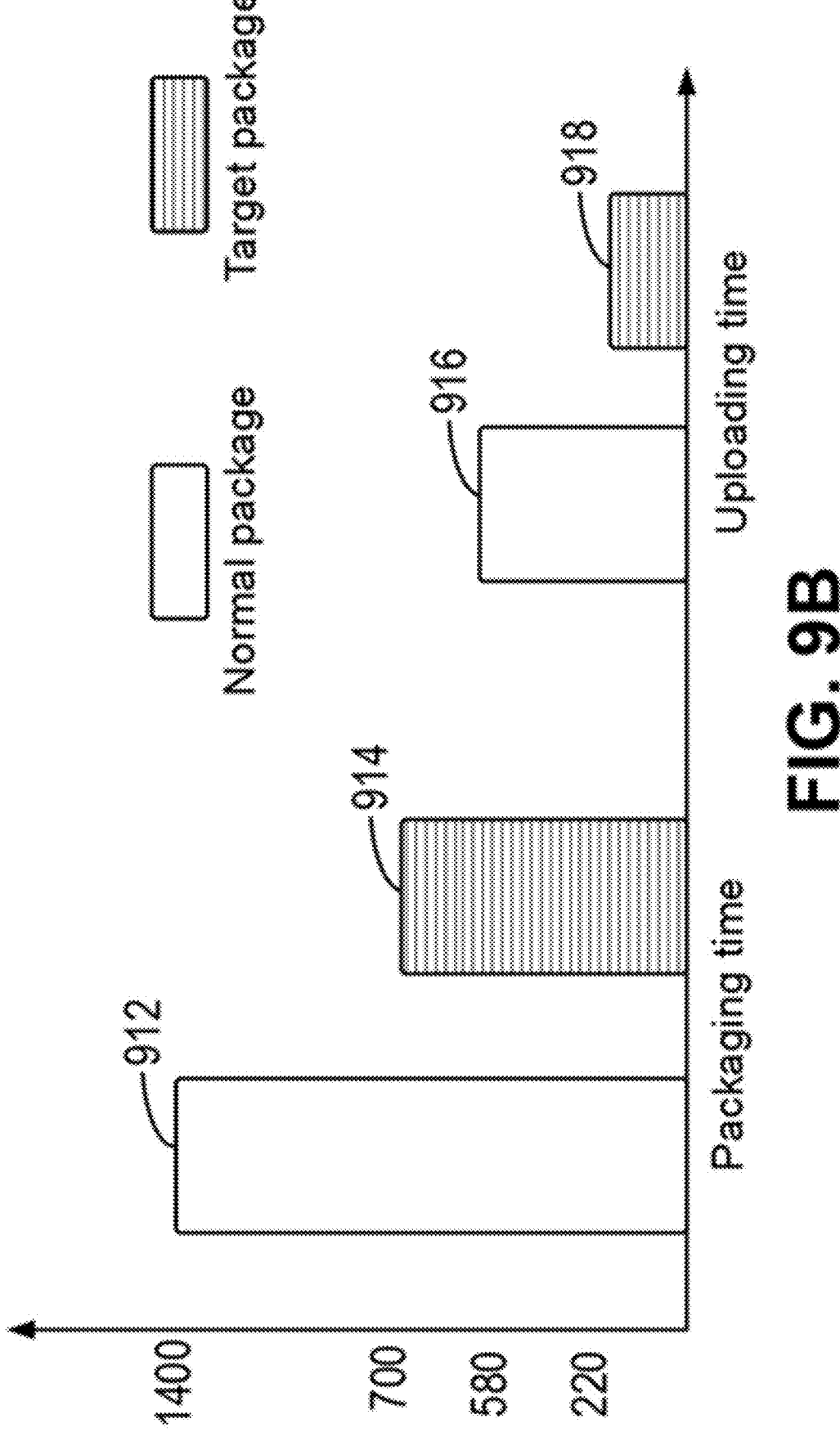
FIG. 9B is a schematic diagram of the time shortening effect according to an embodiment of the present disclosure.

FIG. 9B is a schematic diagram of the time shortening effect according to an embodiment of the present disclosure. A rectangle 912 represents the time taken by a normal packaging process, which, for example, may be 1400 seconds. A rectangle 914 represents the time taken for packaging using the method according to an embodiment of the present disclosure, which is only about 700 seconds. As can be seen, in the packaging process, the method according to the embodiment of the present disclosure can shorten the packaging time.

In addition, a rectangle 916 represents the time required for uploading the package generated by the conventional packaging process, which, for example, may be 580 seconds. A rectangle 918 represents the time required for uploading the target package generated by packaging using the method according to an embodiment of the present disclosure, which is only 220 seconds. As can be seen, the method according to the embodiment of the present disclosure can shorten the uploading time of the package.

Figure 10:
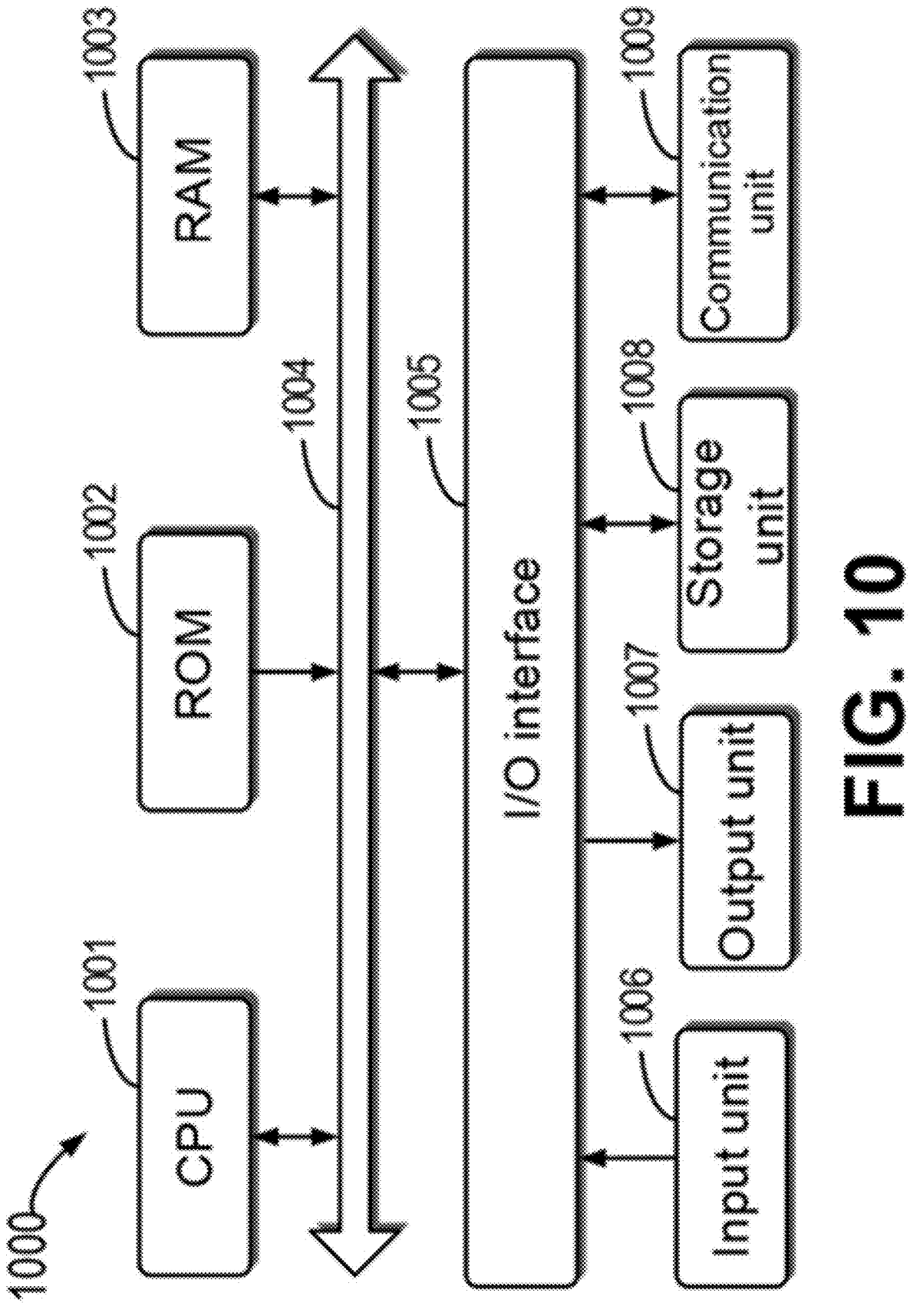
FIG. 10 is a schematic block diagram of an example device that can be used to implement an embodiment of the present disclosure.

FIG. 10 is a schematic block diagram of an example device 1000 that can be used to implement an embodiment of the present disclosure. As shown in the figure, the device 1000 includes a computing unit 1001 that can perform various appropriate actions and processing according to computer program instructions stored in a read-only memory (ROM) 1002 or computer program instructions loaded from a storage unit 1008 to a random access memory (RAM) 1003. Various programs and data required for the operation of the device 1000 may also be stored in the RAM 1003. The computing unit 1001, the ROM 1002, and the RAM 1003 are connected to each other through a bus 1004. An input/output (I/O) interface 1005 is also connected to the bus 1004.

A plurality of components of the device 1000 are connected to the I/O interface 1005, including: an input unit 1006 such as a keyboard and a mouse; an output unit 1007 such as various types of displays and speakers; a storage unit 1008 such as a magnetic disk and an optical disc; and a communication unit 10010 such as a network card, a modem, and a wireless communication transceiver. The communication unit 10010 allows the device 1000 to exchange information/data with other devices via a computer network, such as the Internet, and/or various telecommunication networks.

The computing unit 1001 may be various general-purpose and/or special-purpose processing components with processing and computing power. Some examples of the computing units 1001 include, but are not limited to, central processing units (CPUs), graphics processing units (GPUs), various specialized artificial intelligence (AI) computing chips, various computing units for running machine learning model algorithms, digital signal processors (DSPs), and any appropriate processors, controllers, microcontrollers, etc. The computing unit 1001 performs various methods and processing described above, such as the method 200. For example, in some embodiments, the method 200 may be implemented as a computer software program that is tangibly included in a machine-readable medium, such as the storage unit 1008. In some embodiments, part or all of the computer program may be loaded and/or installed onto the device 1000 via the ROM 1002 and/or the communication unit 10010. When the computer program is loaded to the RAM 1003 and executed by the computing unit 1001, one or more steps of the method 200 described above can be performed. Alternatively, in other embodiments, the computing unit 1001 may be configured to implement the method 200 in any other suitable manners (such as by means of firmware).

The functions described hereinabove can be performed at least in part by one or more hardware logic components. For example, non-restrictively, demonstration types of hardware logic components that can be used include Field Programmable Gate Arrays (FPGAs), Application Specific Integrated Circuits (ASICs), Application Specific Standard Parts (ASSPs), Systems On Chip (SOC), Complex Programmable Logic Devices (CPLDs), etc.

Program codes for implementing the method of the present disclosure may be written by using one programming language or any combination of multiple programming languages. The program codes may be provided to a processor or controller of a general purpose computer, a special purpose computer, or another programmable data processing apparatus, such that the program codes, when executed by the processor or controller, cause the functions/operations specified in the flow charts and/or block diagrams to be implemented. The program codes may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. Additionally, although operations are depicted in a particular order, it should be understood that such operations are required to be performed in the particular order shown or in a sequential order, or that all illustrated operations should be performed to achieve desirable results. In certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. In contrast, various features that are described in the context of a single implementation may also be implemented in multiple implementations separately or in any suitable sub-combination.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, micro-code, firmware instructions, status setting data, or source code or object code written in any combination of one or more programming languages, the programming languages including object-oriented programming languages, such as Smalltalk and C++, as well as conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or other programmable data processing apparatuses to produce a machine, such that these instructions, when executed by the processing unit of the computer or other programmable data processing apparatuses, produce means for implementing the functions/acts specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored thereon includes an article of manufacture that includes instructions that implement various aspects of the functions/actions specified in one or more blocks in the flow charts and/or block diagrams.

The computer-readable program instructions may also be loaded onto a computer, other programmable data processing apparatuses, or other devices, such that a series of operations or steps are performed on the computer, other programmable data processing apparatuses, or other devices to produce a computer-implemented process, such that the instructions executed on the computer, other programmable data processing apparatuses, or other devices implement the functions/actions specified in one or more blocks in the flow charts and/or block diagrams.

The flow charts and block diagrams in the drawings illustrate the architectures, functions, and operations of possible implementations of the systems, methods, and computer program products according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

What is claimed is:

1. A method, comprising:
acquiring, by a system comprising at least one processor, mirror files comprising layers, wherein each mirror file of the mirror files comprises at least one respective layer;
generating a directory by de-duplicating the layers of the mirror files, resulting in de-duplicated mirror files;
using hard links, redirecting the de-duplicated mirror files to the directory, resulting in redirected mirror files; and
packaging the redirected mirror files and the directory into a target package,
wherein each layer of the layers comprises a layer name and layer data, and wherein the generating of the directory by de-duplicating the layers of the mirror files comprises:
for each mirror file of the mirror files, acquiring at least one layer name of the at least one respective layer comprised in the mirror file, wherein different layers of the at least one respective layer have different layer names, the acquiring for each mirror file resulting in layer names of the mirror files; and
establishing at least one sub-directory according to the layer names of the mirror files, wherein identical layer names of the layer names correspond to a same directory entry in the at least one sub-directory.

2. The method claim 1, wherein the generating of the directory by de-duplicating the layers of the mirror files further comprises:
adding layer data corresponding to each layer name of the layer names to the at least one sub-directory to obtain the directory; and
removing the layers of the mirror files.

3. The method of claim 1, wherein each mirror file of the mirror files comprises a respective list of the at least one respective layer comprised in the mirror file.

4. The method of claim 1, wherein each layer name is expressed in the format of character string, wherein the directory comprises sub-directories, and wherein the establishing of the at least one sub-directory according to the layer names of the mirror files comprises:
for each layer name of the at least one respective layer of each mirror file:
acquiring a preset number of characters in the layer name as a first name of the layer name;
detecting whether there is a sub-directory identical to the first name; and
adding, in response to detecting that there is the sub-directory identical to the first name, the layer name to the sub-directory as a directory entry of the sub-directory.

5. The method of claim 4, further comprising:
establishing, in response to detecting that there is no sub-directory identical to the first name, a first sub-directory according to the first name; and
adding the layer name to the first sub-directory as the directory entry of the first sub-directory.

6. The method of claim 1, wherein the redirecting of the de-duplicated mirror files to the directory comprises:
for each layer name of the layer names:
acquiring a matching directory entry from the directory according to the layer name; and
establishing a target file in the mirror file by using a hard link of the hard links, the target file pointing to layer data corresponding to the matching directory entry.

7. The method of claim 6, wherein the matching directory entry has a same name as the layer name.

8. The method of claim 1, further comprising:
uploading the target package to a network node; and
downloading the target package from the network node as part of a request to deploy the mirror files of the target package.

9. The method of claim 1, further comprising:
uploading the target package to a network node; and
downloading, in response to a request to deploy a target mirror file in the mirror files, the target mirror file in the target package from the network node.

10. The method of claim 9, further comprising:
adding a read-write layer to the target mirror file to obtain an adjusted mirror file; and
executing the adjusted target mirror file according to various layers of the adjusted target mirror file.

11. A device, comprising:
at least one processor; and at least one memory coupled to the at least one processor and having instructions stored therein, wherein the instructions, when executed by the at least one processor, cause the device to perform operations, comprising:

acquiring mirror files comprising layers, wherein each mirror file in the mirror files comprises at least one corresponding layer;

generating a directory by de-duplicating the layers of the mirror files, resulting in de-duplicated mirror files;

redirecting the de-duplicated mirror files to the directory by using hard links, resulting in redirected mirror files; and packaging the redirected mirror files and the directory into a target package, wherein the at least one corresponding layer of each mirror file comprises at least one corresponding layer name and corresponding layer data, and wherein generating the directory by the de-duplicating of the layers of the mirror files comprises:

acquiring the at least one corresponding layer name of the at least one corresponding layer comprised in each mirror file, in aggregate resulting in layer names of the mirror files, wherein different layers have different layer names; and establishing at least one sub-directory according to the layer names of the mirror files, wherein identical layer names of the layer names correspond to the same directory entry in the at least one sub-directory.

12. The device of claim 11, wherein generating the directory by the de-duplicating of the layers of the mirror files comprises:

adding the layer data corresponding to each layer name to the at least one sub-directory to obtain the directory; and removing the layers of the mirror files.

13. The device of claim 11, wherein each mirror file of the mirror files comprises a list, and the list records the at least one corresponding layer name of the at least one corresponding layer comprised in the mirror file.

14. The device of claim 11, wherein the at least one corresponding layer name is expressed in the format of character string, wherein the directory comprises sub-directories, and the establishing of the at least one sub-directory according to the layer names of the mirror files comprises:

for each layer name of the at least one corresponding layer of each mirror file:

acquiring a preset number of characters in the at least one corresponding layer name as at least one name of the at least one corresponding layer name;

detecting whether there is a sub-directory identical to the at least one name; and adding, in response to determining that the sub-directory identical to the at least one name is present, the at least one corresponding layer name to the sub-directory as a directory entry of the sub-directory.

15. The device of claim 14, wherein the operations further comprise:

establishing, in response to determining that the sub-directory identical to the at least one name is absent, at least one first sub-directory according to the at least one name; and adding the at least one layer name to the at least one first sub-directory as a directory entry of the at least one first sub-directory.

16. The device of claim 11, wherein the redirecting of the de-duplicated mirror files to the directory by using hard links comprises:

acquiring each layer name of the at least one corresponding layer name of each mirror file in the mirror files, resulting in acquired layer names; and for each layer name of the acquired layer names:

acquiring a matching directory entry from the directory according to the layer name; and establishing a target file in the mirror file by using a hard link, the target file pointing to layer data corresponding to the matching directory entry.

17. The device of claim 16, wherein the matching directory entry has the same name as the layer name.

18. A computer program product, the computer program product being stored on a non-transitory computer-readable medium and comprising machine-executable instructions, wherein the machine-executable instructions, when executed, cause a machine to perform acts, comprising:

acquiring a group of mirror files, wherein each mirror file in the group of mirror files comprises at least one layer;

generating a directory by de-duplicating a group of layers of the group of mirror files;

redirecting the group of de-duplicated mirror files to the directory by using hard links; and packaging the group of redirected mirror files and the directory into a target package, wherein the at least one layer of each mirror file comprises at least one corresponding layer name and corresponding layer data, and wherein generating the directory by the de-duplicating of the group of layers of the group of mirror files comprises:

acquiring the at least one layer name of the at least one layer comprised in each mirror file, in aggregate resulting in layer names of the mirror files, wherein different layers have different layer names; and establishing at least one sub-directory according to the layer names of the mirror files, wherein identical layer names of the layer names correspond to the same directory entry in the at least one sub-directory.

19. The computer program product of claim 18, wherein the acts further comprise:

uploading the target package to a node; and downloading the target package from the node in response to deploying the group of mirror files of the target package.

20. The computer program product of claim 18, wherein the acts further comprise:

downloading, in response to deploying a target mirror file in the group of mirror files, the target mirror file in the target package from a node.

* * * * *